United States Patent [19]

Klas et al.

[11] Patent Number: 4,897,942
[45] Date of Patent: Feb. 6, 1990

[54] HIGH EFFICIENCY SNOWTHROWER

[75] Inventors: Kenneth H. Klas, Port Washington; Richard R. Brown, Fredonia, both of Wis.

[73] Assignee: Simplicity Manufacturing, Inc., Port Washington, Wis.

[21] Appl. No.: 257,798

[22] Filed: Oct. 14, 1988

[51] Int. Cl.⁴ .............................................. E01H 5/09
[52] U.S. Cl. ........................................ 37/244; 474/12; 474/17
[58] Field of Search ............... 37/244, 246, 248–252, 37/257, 259; 74/730, 650, 689, 729, 863, 865; 192/48.8, 49; 280/493; 474/12, 17

[56] References Cited

U.S. PATENT DOCUMENTS

| Re. 31,361 | 8/1983 | Smirl | 74/863 |
| 2,994,228 | 10/1958 | Osborne . | |
| 3,383,927 | 5/1968 | Suchy | 37/244 |
| 3,393,572 | 7/1968 | Larsson . | |
| 3,504,560 | 4/1970 | Wunsch | 474/17 |
| 3,771,377 | 11/1973 | Bush . | |
| 4,023,635 | 5/1977 | Teal | 474/12 |
| 4,088,036 | 5/1978 | Hillman | 474/12 |
| 4,289,214 | 9/1981 | Spence | 280/493 |
| 4,348,197 | 9/1982 | Oliver | 474/17 |
| 4,350,491 | 9/1982 | Steven | 474/17 |
| 4,458,559 | 7/1984 | Croswhite et al. | 192/488 |
| 4,504,247 | 3/1985 | Chana et al. . | |
| 4,571,216 | 2/1986 | Stieg et al. | 474/17 |
| 4,605,386 | 8/1986 | Harris | 474/17 |
| 4,689,036 | 8/1987 | Love . | |
| 4,783,915 | 11/1988 | Sasaki et al. | 37/251 |

FOREIGN PATENT DOCUMENTS

| 96758 | 12/1983 | European Pat. Off. | 74/865 |
| 628215 | 10/1978 | U.S.S.R. | 37/250 |
| 699081 | 11/1979 | U.S.S.R. | 37/251 |
| 1603853 | 12/1981 | United Kingdom | 74/689 |

Primary Examiner—Eugene H. Eickholt
Attorney, Agent, or Firm—Michael D. Rechtin; Philip P. Mann

[57] ABSTRACT

A snow removal apparatus operable in a substantially optimum efficiency state using a variable ratio pulley. The snow removal apparatus includes a feature for sensing power demand made on the snowthrower under variable snow conditions. Responsive to the power demand, the fan speed and/or auger speed is reduced or increased in order to use the full engine power without stalling the engine.

2 Claims, 2 Drawing Sheets

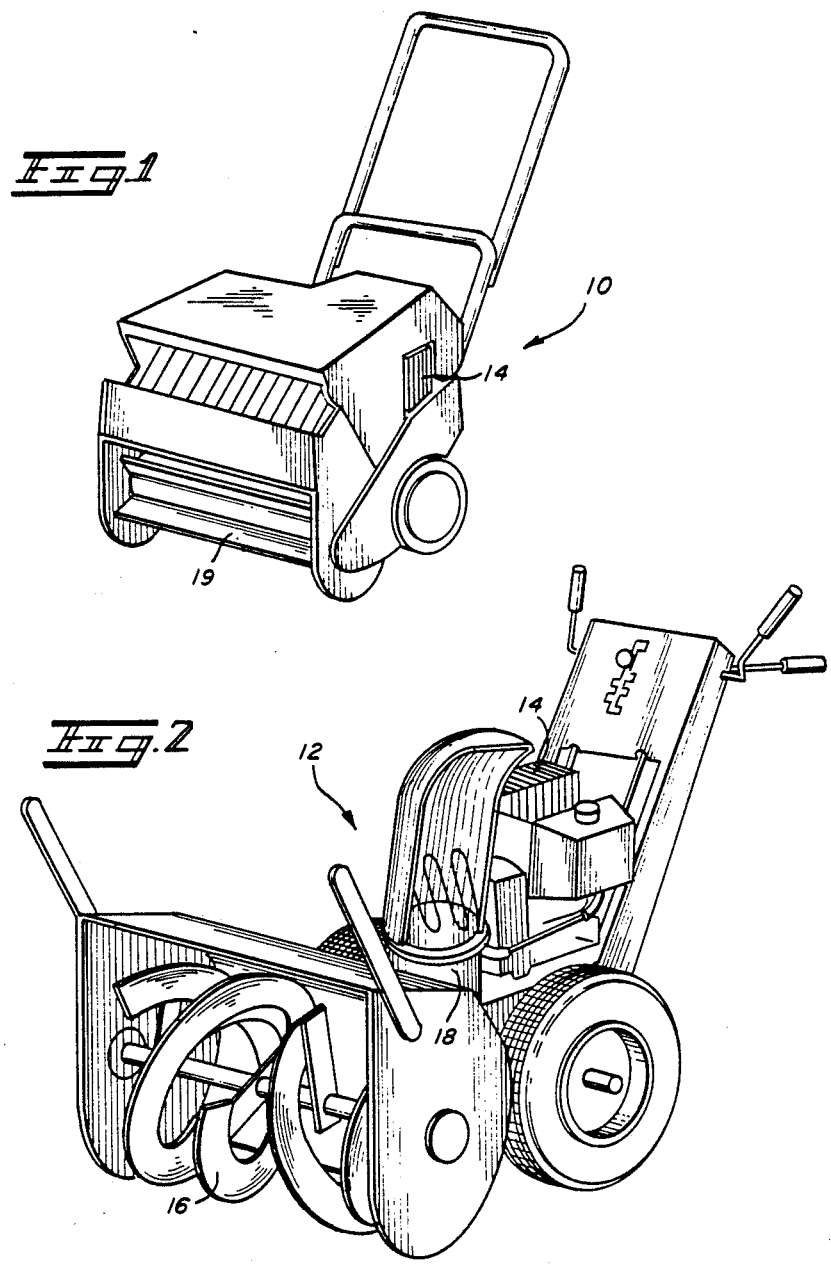

HIGH EFFICIENCY SNOWTHROWER

This invention is related generally to an improved snowthrower and more particularly is related to a snowthrower and a method for maintaining optimum snowthrowing efficiency and maximum throwing distance regardless of the depth and weight of the snow encountered by the snowthrower.

Conventionally, snowthrowers are equipped with one fan speed for throwing snow, such as, by a single stage paddle fan or a fan in the second stage of a two stage snowthrower. During operation of such snowthrowers the user can encounter varying snow depth and/or weight, and the snow conditions can be so demanding that the user cannot efficiently operate the snowthrower. In response to very demanding snow conditions the snowthrower motor will frequently stall, and the user must resort to one of the following: (1) removing the snow in a series of layers, (2) by using only a fraction of the snowthrower input opening, (3) by using a snowthrower with excess horsepower or (4) by very slowly moving the snowthrower thru the deep or heavy snow. Operation in these various modes is highly inefficient, extremely time consuming and can be hazardous in situations where the user must lift the snowthrower to remove the snow in a layer by layer manner.

BRIEF SUMMARY OF THE INVENTION

It is therefore an object of the invention to provide an improved snowthrowing method and apparatus.

It is another object of the invention to provide a novel snowthrower operable at substantially optimum engine power and efficiency under variable snow conditions.

It is an additional object of the invention to provide an improved snowthrower capable of generating a maximum speed for the snowthrowing element responsive to variable snow conditions.

It is a further object of the invention to provide a novel snowthrower having a power demand sensing feature adapted to change the operational rate of the snowthrower drive train to increase the efficiency and maximize snowthrowing distance for all snow conditions.

A feature of the snowthrower in accordance with the invention lies in operation of the snowthrower at substantially optimum efficiency under a variety of snow conditions. A sensing feature monitors the power demand arising as a consequence of changes in the depth and weight of the snow encountered. As the power demand changes, the sensing feature causes the snowthrowing element to change to the maximum speed possible under the conditions without stalling the engine. The operational sensitivity enables use of the snowthrower under a wide range of conditions and increases the efficiency and the snowthrowing distance.

Further objects and advantages of the present invention, together with the organization and the manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a perspective view of a single stage type snowthrower;

FIG. 2 is a perspective view of a two stage type snowthrower; and

FIG. 3A is a variable rate pulley shown operating under light to moderate power demand conditions and FIG. 3B is the pulley shown operating under heavy power demand conditions.

DESCRIPTION OF PREFERRED EMBODIMENTS

Figure 7A:
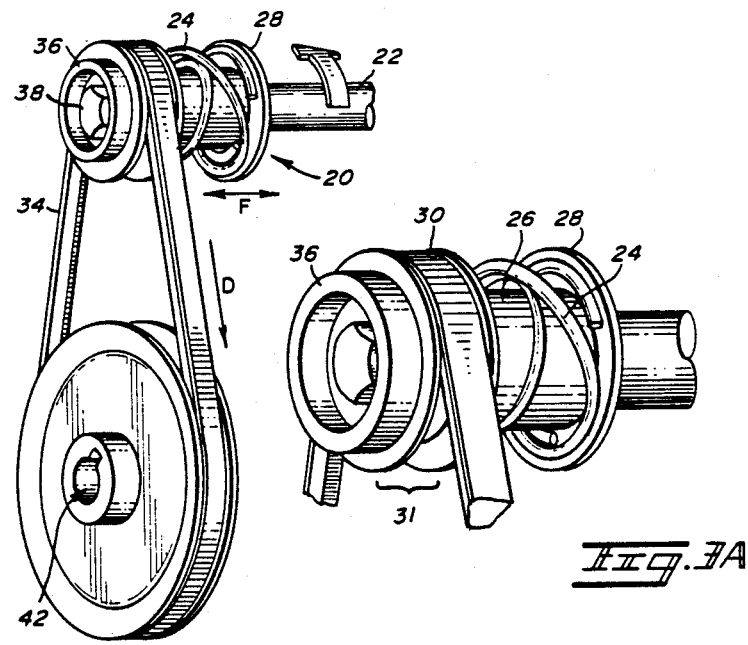
Figure 7B:
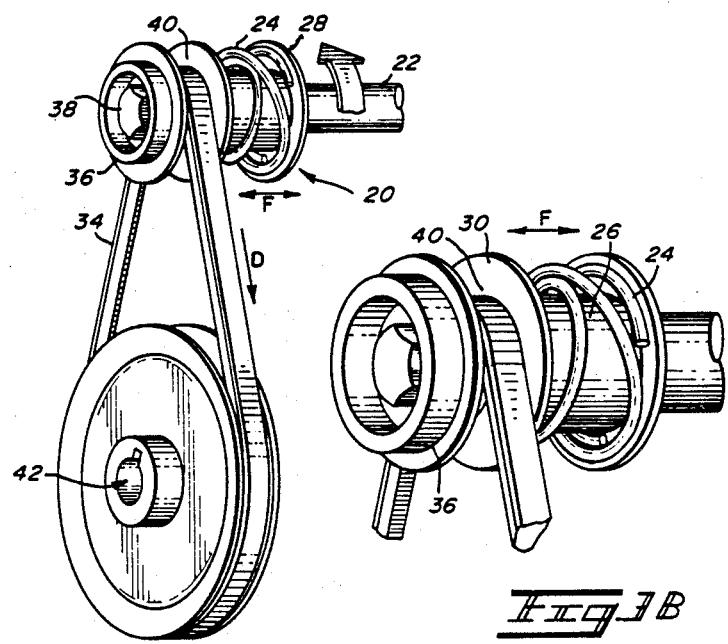

Referring to the drawings and in particular to FIGS. 1 and 2, there are illustrated a single stage snowthrower 10 and a two stage snowthrower 12, respectively. Each of the snowthrowers 10 and 12 include an engine 14 for providing power to various snowthrower drive train components. The snowthrowers 10 and 12 include means for engaging and displacing accumulated snow, such as, for example, an auger 16 and a fan 18 in the two stage snowthrower 12 or paddle fan 19 (typically an auger/fan combination) in the single stage snowthrower 10. The engine 14 is connected to these various engaging and displacing elements by coupling means so as to maintain a substantially constant load on the engine 14, regardless of the weight and depth of the snow encountered. In FIGS. 3A and 3B are shown a preferred form of the coupling means, a variable rate pulley 20 which is coupled to an output shaft 22 of the engine 14. A spring 24 is disposed about slideable shaft 26 and positioned between a fixed flange 28 and a movable flange 30. Together the flange 30 and a fixed end flange 36 act as a pair of pulley halves 31 which are spring biased towards each other by a spring restoring force, F, arising from the spring 24. The flange 30 is fixedly coupled to the slideable shaft 26 which has an outside diameter slideably disposed within the output shaft 22. The slideable shaft 26 thus allows longitudinal or axial movement of the flange 30.

A pulley belt 34 rides between the movable flange 30 and a fixed end flange 36. The fixed end flange 36 is coupled to the distal end of end shaft 38, having an outside diameter which slides within both the inside diameter of the moveable flange 30 and the inside diameter of the slideable shaft 26. The proximate end of the shaft 38 is fixedly coupled to the output shaft 22, and thus the shaft 38 can rotate with the output shaft 22. Each of the flanges 30 and 36 include beveled inner face surfaces 40, permitting the pulley belt 34 to ride smoothly up and down as the axial spacing changes between the pulley halves 31. Such an axial change of spacing can arise as a consequence of snowthrowing forces being generated on impeller 42 shown in FIG. 3. As the power demand is made on the impeller 42, a force vector D is generated along the pulley belt 34 which in turn causes forces to be applied to the beveled face surfaces 40. The vector component of force D along the axis of the output shaft 22 opposes the spring restoring force, F, causing the spacing to increase between the pulley halves 31. The pulley belt 34 therefore rides down between the face surfaces 40, resulting in a smaller drive axis diameter. This decrease of drive axis diameter in turn changes the effective pulley diameter ratio for the variable rate pulley 20 connecting the engine 14 and the impeller 42. Therefore, the rotational speed of the impeller 42 on the output side also changes. As shown in FIGS. 3A and 3B, when the snow conditions change from light to heavy snow and the power demand increases, the effective pulley ratio increases, which in turns causes a decrease in the speed of the impeller 42. This change of speed is transmitted to the snowthrower drive train components connected to the impeller 42. This adjustability feature has significant advantages, as illustrated in the example of FIG. 3. A change from light/moderate snow conditions in FIG. 3A to the heavy wet snow conditions of FIG. 3B results in an increase in the effective pulley diameter ratio (the ratio of the engine shaft pulley diameter to the impeller pulley diameter). This change also causes a decrease in rotational speed of the impeller 42 which avoids engine stall (or engine droop or motor rpm drop in other intermediate states) while using the available engine power to continue efficient snowthrowing operation at lower fan speeds. Under some snow conditions engine stall is avoided by decreasing engine speed to maintain operation. Although the engine may be pulled down into an operating range of less than optimum efficiency, motor stall is avoided and snowthrowing distance is optimized.

The adjustability of the rotational speed of the impeller 42 can be used to general advantage in coupling the snowthrower power train to the engine 14. Thus, in the general sense this adjustability feature allows optimizing snowthrower operation of the drive train for a wide range of power demand conditions. As another example of operation of the two stage snowthrower 12, the impeller 42 can be connected by a power train coupling (not shown) to the fan 18 and also to the auger 16. Consequently, both the fan speed and the auger speed can be adjusted together to provide maximum operating efficiency under the given conditions.

In other forms of the invention the concept of power demand adjustability can be implemented by using either the fan 18 or the auger 16, alone. If operation of the fan 18, alone, is adjustable, both the forward drive speed and the auger feed rate are variables which determine the infeed rate of the snow to the snowthrower 12. The fan 18 must therefore be adjustable to accommodate the range of resulting infeed rates. Likewise, if the auger 16, alone, is adjustable, and the fan 18 runs at a substantially constant speed, the range of adjustability of the auger 16 should accommodate the commercially expected infeed rates.

Since snow conditions can vary from time to time or over the area being cleaned at a given time (such as a wind blown snow drift or down an incline), the full available engine power can be utilized with great efficiency in the subject invention. Actual operating data are shown in Table I for the two stage snowthrower 12, with and without the ability to adjust to snow conditions. As can be seen, the throwing distance is markedly increased when the variable rate pulley 20 is incorporated into the two stage snowthrower 12. Table I also demonstrates the effect of snowthrower ground speed on the percentage improvement. The ground speed affects the rate of snow intake, and too large a ground speed can result in exceeding the range of adjustability for the variable rate pulley 20.

In the other embodiments of the invention the range of adjustability can be expanded to include larger ranges or can be designed to accommodate particular range of expected snow conditions. The data of Table I for the first and second forward speeds of the two stage snowthrower 12 are particularly reliable in that engine overloading clearly did not occur and thus is believed to be the most representative of the efficiency improvements possible.

TABLE I

|  | Throwing to Right (6" snow) | | | | | Throwing to Left (7.5" snow) | | | | |
| --- | --- | --- | --- | --- | --- | --- | --- | --- | --- | --- |
|  | 1st Forward Speed | 2nd Forward Speed | 3rd Forward Speed | 4th* Forward Speed | 5th Forward Speed | 1st Range | 2nd Range | 3rd Range | 4th Range | 5th Range |
| With variable rate pulley | 33' | 34' | 24.5' | 17.5'/19' | 17' | 20' | 20' | 16.5' | 16' | 16' |
| Without variable rate pulley | 24' | 23' | 21' | 19'/15.5' | 15' | 12' | 16' | 15' | 15' | 13' |
| % increase distance | 38% | 48% | 17% | 23% | 13% | 67% | 25% | 10% | 6% | 19% |
| Without torque sensor and with production chute | 21' | 21' | 17.5' | 16.5' | 18' | 15' | 19.5' | 17' | 15.5' | 15.5' |
| % difference | −14% | −9% | −20% | +6% | +20% | +25% | +22% | +13% | +3% | +19% |

*shifted on to preserve engine h.p. - normal eng. output
Snowbank Test
(13" height, 870)

|  | Throwing Distance 1st gear | |
| --- | --- | --- |
|  | Left | Right |
| Production w/Round Deflector | 15' | 13' |
| Torque Sensor w/Round Deflector | 19.5' | 17' |

The concept of the variable rate pulley 20 can also be applied to the direct drive of the single stage snowthrower 10 shown in FIG. 1. In the same general manner as for the two stage snowthrower 12, the effective pulley diameter ratio can adjust responsive to the power demand transmitted by the impeller 42. This adjustment decreases or increases the speed of the paddle fan 19 as the power demand increases or decreases, respectively.

In other forms of the invention the coupling means can embody any one of a number of automatic sensing means besides the variable rate pulley 20. For example, the sensing means can be an engine rpm sensor or a device to sense the tension present in a chain or belt drive of a self propelled snowthrower. For the case of a tension sensor (not shown) it can modify an adjustment means, such as the drive train coupling, to provide a substantially constant load on the engine and maximum speed for the snow displacing means (the paddle fan 19 in the single stage snowthrower and the fan 18 in the two stage snowthrower 12).

The snowthrower embodies significant commercial advantages including the ability to adjust to widely varying snow conditions, such as wet or deep snow, by changing fan and/or auger speed to make optimum use of engine power. A simple variable rate pulley, or other sensing and adjusting means, can be used to implement this invention and solve a long standing problem in the snowthrower industry in an efficient and highly economical manner. Even without optimizing variables such as snow discharge direction and snowthrower ground speed, actual data show extremely large and unexpected improvements in snowthrowing distance using the subject invention.

While preferred embodiments of the present invention have been illustrated and described, it will be understood that changes and modifications can be made without departing from the invention in its broader aspects. Various features of the invention are set forth in the following claims.

What is claimed is:

1. A snow removal apparatus, comprising:
an engine;
means for engaging and displacing accumulated snow; and
means for coupling said engine to said engaging and displacing means so as to maintain a substantially constant load on said engine and while said engine operates at said constant load said coupling means transmits the power from said engine to said displacement means to achieve maximum snowthrowing distance for the engaged snow depending on the weight and depth of the accumulated snow encountered by said engaging and displacing means.

2. A snow removal apparatus, comprising:
an engine adapted to provide power for operation of said snow apparatus;
rotating means driven by said engine for moving accumulated snow; and
means for coupling said engine to said rotating means for moving snow, said coupling means including sensing means for measuring the power demand made on said engine for changing the operational rate of said rotating means to maximize snowthrowing distance and adjusting means for maintaining the maximum horsepower output without stalling of said engine responsive to the output from said sensing means.

* * * * *